(12) United States Patent
Yegin et al.

(10) Patent No.: US 7,286,671 B2
(45) Date of Patent: Oct. 23, 2007

(54) SECURE NETWORK ACCESS METHOD

(75) Inventors: Alper E. Yegin, Foster City, CA (US); Xiaoning He, Sunnyvale, CA (US); Carl Williams, Palo Alto, CA (US)

(73) Assignee: NTT DoCoMo Inc., Tokyo (JP)

( * ) Notice: Subject to any disclaimer, the term of this patent is extended or adjusted under 35 U.S.C. 154(b) by 906 days.

(21) Appl. No.: 10/185,359

(22) Filed: Jun. 28, 2002

(65) Prior Publication Data

US 2003/0091030 A1    May 15, 2003

Related U.S. Application Data

(60) Provisional application No. 60/345,967, filed on Nov. 9, 2001, provisional application No. 60/332,396, filed on Nov. 9, 2001.

(51) Int. Cl.
*H04K 1/00*       (2006.01)
(52) U.S. Cl. .................... 380/270; 713/156; 726/4; 726/5; 726/18; 726/19; 726/28; 726/29
(58) Field of Classification Search ............ None
See application file for complete search history.

(56) References Cited

U.S. PATENT DOCUMENTS

| | | | | |
|---|---|---|---|---|
| 6,760,444 | B1* | 7/2004 | Leung | 380/270 |
| 2002/0012433 | A1* | 1/2002 | Haverinen et al. | 380/247 |
| 2002/0069278 | A1* | 6/2002 | Forslow | 709/225 |
| 2002/0075844 | A1* | 6/2002 | Hagen | 370/351 |
| 2002/0157090 | A1* | 10/2002 | Anton, Jr. | 717/178 |
| 2003/0063581 | A1* | 4/2003 | Shanbhag et al. | 370/328 |
| 2005/0149764 | A1* | 7/2005 | Bahl et al. | 713/202 |

FOREIGN PATENT DOCUMENTS

| JP | 2001-169341 | 6/2001 |
|---|---|---|
| JP | 2003-234740 | 8/2003 |

OTHER PUBLICATIONS

Zao et al. "A public-key based secure Mobile IP", Wireless Network 5 (1999), pp. 373-390.*
Yegin, Alper E. et al. "Secure Network Access Using Router Discovery and AAA" UNAP Working Group, Internet Draft, Category: Standards Track, Nov. 14, 2001, pp. 1-14.
Flykt, Patrick et al. "AAA for IPv6 Network Access" UPng Working Group, Internet Draft, Jul. 20, 2001, p. 1-33.

* cited by examiner

*Primary Examiner*—Taghi Arani
(74) *Attorney, Agent, or Firm*—Edward C. Kwok; MacPherson Kwok Chen & Heid LLP

(57) ABSTRACT

The present invention provides network-layer authentication protocols for authenticating mobile client and access router to each other. The present invention uses Router Discovery as a carrier to implement the authentication protocols. In an embodiment of the present invention, a mobile client sends out a solicitation message to request connectivity service. The solicitation message contains a proof of identity of the mobile client. An access router that receives the solicitation message will not respond to it until the proof of the identity is verified. Only when the proof of identity of the mobile client is verified, will the access router respond and return an advertising message to the mobile client, thereby preventing unauthorized mobile clients from obtaining network access.

37 Claims, 14 Drawing Sheets

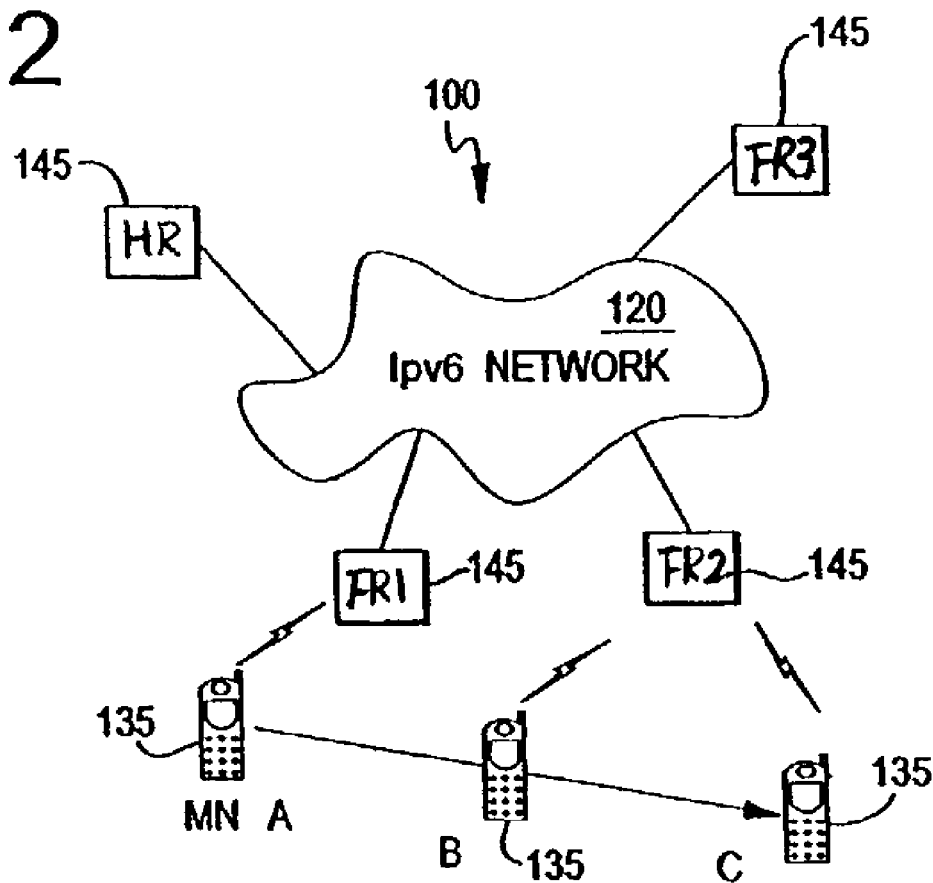

SECURE NETWORK ACCESS METHOD

This application claims the benefit of U.S. Provisional Application No. 60/345,967, filed Nov. 9, 2001, entitled "Secure Network Access Using Router Discovery and AAA," which is hereby incorporated by reference.

This application is also cross referenced to a non-provisional application Ser. No. 10/146,548 filed May 15, 2002 entitled "METHOD FOR SECURING ACCESS TO MOBILE IP NETWORK," and U.S. Provisional Application No. 60/332,396, filed Nov. 9, 2001, entitled "MOBILE IP REGISTRATION," both of which are hereby incorporated by reference.

BACKGROUND OF THE INVENTION

This invention relates in general to two-way security protocols for authenticating clients and access routers to each other when the clients seek connectivity service for network access and when the routers offer network connectivity. The security protocols according to the present invention build upon AAA (Authentication, Authorization and Accounting) and use Router Discovery as a carrier for implementing the security protocols.

Public access IP networks are widely deployed with the proliferation of globally routable IP-aware devices, such as cell phones and personal digital assistants (PDA). Especially, the progress in cellular radio technology and the growth rate of the cellular telephone systems over the last several years is indicative of tremendous market demand for location independent communication. The role of wireless has gone well beyond the traditional voice and paging mobile radio services of a few short years ago. The International Telecommunication Union (ITU), the recognized authority for worldwide network standards, has recently published its International Mobile Telecommunications-2000 (IMT-2000) standard. The standard proposes so-called third generation (3G) networks that include extensive mobile access by wireless, mobile clients including cellular phones, PDAs, handheld computers, and the like. In the proposed 3G networks, mobile clients, or roaming clients, are free to move and allowed to change their points of attachment from one base station to another while maintaining access to network resources. Some of the 3G networks provide mobility at link layer (layer 2). But the future networks (so called 4G) are expected to provide mobility at IP layer (layer 3).

The Internet Engineering Task Force (IETF), an international community of network designers, operators, vendors, and researchers concerned with the evolution of the Internet architecture and the smooth operation of the Internet, have proposed several standards for mobility support at IP layer. These include proposed standards for IP Mobility Support such as IETF RFC 2002, also referred to as Mobile IP Version 4 (IPv4), and draft working document <draft-ietf-mobileip-ipv6-17> entitled "Mobility Support in IPv6," also referred to as Mobile IP Version 6, both of which are incorporated herein by reference. According to the protocol operations defined in Mobile IPv4 and IPv6, while maintaining access to network resources, a client is allowed to move over networks and change its point of attachment from one access router to another. This operation is commonly referred to as "Layer 3 (L3) handoff."

The purpose of performing the L3 handoff operation is to update packet routing information on a roaming client through a registration process. A client is always addressable by its "home address," an IP address assigned to the client by an access router on the home network (home router) or chosen by the client itself. While situated away from its home on a foreign network, however, a client is configured with a care-of address which indicates the client's current point of attachment to the network. The care-of address is the address of an access router on the foreign network (foreign router), and the client operating away from home registers its care-of address with its home router. The home router that has received a registration request then intercepts packets destined for the client and routes the packets to the client's care-of address. In Mobile IPv6, a client away from home sends a binding update to its home router and any correspondent node in communication. A correspondent node may be a mobile client like the client or may be a server that provides data to the client. The correspondent node that has received the binding update then sends packets directly to the client without routing them through the home router.

A crucial security issue arises when a roaming client seeks network connectivity in a visited network. The client has to be authenticated before any network access is granted to it. An unauthenticated client may be a free-loader that tries to access network resources under a false or stolen ID. Such a client may also be a malicious node seeking network access only for the purpose of disrupting the orderly operation of networks. Similarly, clients may want to authenticate access routers which are offering network connectivity to the client. The access router may be a rogue router that will eavesdrop the client's communication or divert the communication to somewhere else or just drop the communication. Currently, there are numerous authentication mechanisms implemented and deployed for various access technologies. Examples include authentication of PPP and 802.11 networks. One drawback to utilizing these networks is that these networks provide link-layer solutions; as such their applicability is limited to specific access technologies. It is clearly beneficial to provide a network-layer solution because network-layer solutions do not choose radio access technologies that function below it.

BRIEF SUMMARY OF THE INVENTION

The present invention provides network-layer protocols for authenticating mobile client and access router to each other before any network access is granted to the mobile client. The present invention uses Router Discovery as a carrier to implement the authentication protocols. In an embodiment of the present invention, a mobile client sends out a solicitation message to request connectivity service. The solicitation message contains a proof of identity of the mobile client. An access router that receives the solicitation message will not respond to it until the proof of the identity is verified. Only when the proof of identity of the mobile client is verified, will the access router respond and return an advertising message to the mobile client, thereby preventing unauthorized mobile clients from obtaining network access.

The advertising message from an access router may contain a proof of identity of the access router. The mobile client will initiate network access via the access router only when the proof of the access router is successfully verified, thereby preventing mobile clients from being lured to begin network access via an illegitimate access router.

Using solicitation and advertising messages has advantages in securing network access. The Discovery mechanism is the first step for mobile client and access router to establish off-link connectivity. In other words, using the Discovery mechanism for the purpose of authenticating mobile client and access router is a natural extension to an already established protocol. Piggybacking the authentication of mobile client and access router to the Discovery mechanism will achieve significant saving of protocol signaling, which is critical for mobile and wireless networks where communication resources are precious and expensive. Another advantage of using the Discovery mechanism is that the Discovery mechanism is common to both IPv4 and IPv6. Therefore, the present invention, which uses the Discovery mechanism as a carrier for implementing the authentication of mobile client and access router, will be implementable in networks irrespective of whether the networks adopt IPv4 or IPv6.

The authentication protocols according to the present invention may build on the AAA infrastructure and use the authentication service and protocol signaling provided by AAA protocol. Under AAA protocol, a plurality of domains are defined and each served by at least one AAA server which provides AAA services to mobile clients through attendants, i.e., access routers. In the present invention, a trusted entity is needed to verify the proof of identity of a client contained in a solicitation message. When the client enters a new foreign domain, the trusted entity is an AAA server serving the home domain of the client. Thus, protocol signaling for this initial authentication process may take a long round trip between the client and the home server and may cause communication latency. However, as long as the client stays within the foreign domain, the home server will not be consulted for verification. For instance, the server in the foreign domain becomes the trusted entity when the client switches one access router to another in the domain. Even an access router may become the trusted entity when the client seeks connectivity to the same access router. Thus, the protocol signaling necessary for the authentication protocol according to the present invention will take a shorter round trip, and thus the communication delays caused by the authentication process will also be shortened.

The authentication protocol according to the present invention can be implemented with any key algorithms, such as symmetric and asymmetric cryptographies. Those keys may be distributed along with protocol signaling associated with the authentication process according to the present invention. Those keys are distributed to establish new security associations between two entities that have had no security association in order to secure the rest of the protocol signaling for Neighbor Discovery, such as address resolution (ARP/RARP), and subsequent communications between the entities.

In another embodiment of the present invention, an access router may voluntarily send out advertising messages that contain a proof of identity of the access router. If a client successfully verifies the proof, it begins using the access router as a gateway to the Internet. If the client is unable to verify the proof, it will initiate the authentication process by sending out a solicitation message that contains a proof of its identity. This solicitation message will be processed as outlined above.

In another embodiment of the present invention, a client may send out a solicitation message to an access router while in communication with the access router. There is always the possibility that a legitimate entity is replaced with an illegitimate one even during communication. The solicitation message will trigger to the access router to send out an advertising message that contains a proof of identity of the access router, thereby allowing the client to re-authenticate the access router during communication. Similarly, an access router may send out an advertising message with short router lifetime to a client with which the access router is in communication. In response, the client will send out a solicitation message that contains a proof of its identity, thereby allowing the access router to re-authenticate the client.

A solicitation message from a client and/or an advertising message from an access router may contain a challenge to provide protection against reply attacks.

BRIEF DESCRIPTION OF SEVERAL VIEWS OF THE DRAWINGS

FIG. 2 provides a simplified graphical illustration showing the standard mobile client Layer 3 hand-off process performed in the IP network shown in FIG. 1;

DETAILED DESCRIPTION OF THE INVENTION

The presently preferred embodiments of the invention are described herein with reference to the drawings, wherein like components are identified with the same references. The descriptions of the preferred embodiments contained herein are intended to be exemplary in nature and are not intended to limit the scope of the invention. It should especially be noted that although the embodiments are described with networks that implement Mobile IP, the present invention can be implemented more broadly with any IP based communication protocols, such as IPv4 and IPv6.

Figure 1:
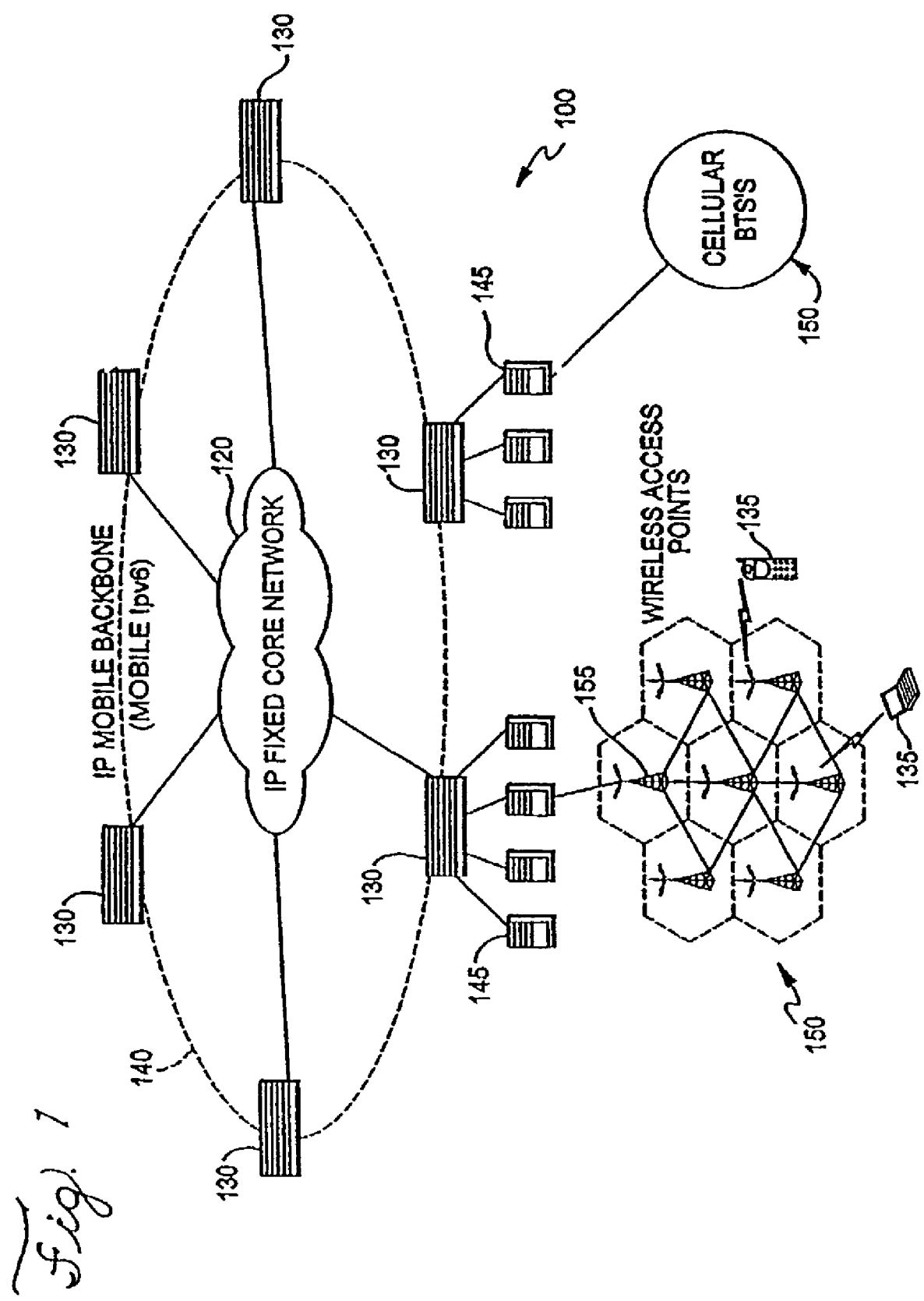
FIG. 1 illustrates an exemplary third generation, wireless, mobile access, IP network in which the invention is intended to find application.

FIG. 1 illustrates an exemplary third generation, wireless, mobile access, IP network 100 in which the invention is intended to find application. For purposes of the present description, it is assumed the data network 100 adheres to the IMT-2000 standards and specifications of the ITU for wireless, mobile access networks. Additionally, it is assumed the data network 100 implements Mobile IP support according to the proposed Mobile IPv4 and Mobile IPv6 standards of the IETF. Thus, it should be noted that in this application, terms peculiar to one version may be used interchangeably with the corresponding terms for the other version. For instance, the term "agent" may be used interchangeably with the term "access router" or just "router" and so may "Agent Discovery" with "Router Discovery," "Agent Solicitation" with "Router Solicitation" and "registration request" with "binding update."

The wireless, mobile access, IP data network 100 has at its core a fixed node IP data network 120 comprising numerous fixed nodes (not shown), i.e., fixed points of connection or links. Digital data is communicated within and over the network in accordance with Internet Protocol version 6 (IPv6). Again, IPv6 is just an example of communication protocol and can be replaced with other communication protocols, such as IPv4. Some of the nodes of the core network 120 comprise conventional routers (not shown), which function as intermediary nodes in accordance with conventional Internet addressing and routing protocols to route packets of data between source and destination nodes connected to the network.

Built on the core 120 is a collection of gateway routers (GR) 130 that comprise an IP mobile backbone 140. The gateways 130 comprising the IP mobile backbone are themselves nodes of the core network 120 and are interconnected via the core network 120. Each gateway 130 has a plurality of access routers 145 connected thereto that can communicate with mobile clients 135. The mobile clients may comprise any number of different kinds of mobile, wireless communication devices including handsets, cellular telephones, hand-held computers, personal information managers or the like. The access routers 145 function as home routers (HR) and foreign routers (FR) to interface the clients 135 to the core network 120 through gateways 130. The routers 145 are Layer 3 access network entities. The clients 135 communicate with the routers 145 through radio access points (AP) 155. The APs 155 are Layer 2 access network entities. A group of APs 155 forms a subnetwork 150 in FIG. 1. Each router 145 serves a subnetwork 150 and provides a network link as an interface between the subnetwork 150 and the data network 100. The clients 135 and the APs employ known CDMA or W-CDMA or similar digital data communication technology to communicate with each other.

Pursuant to Mobile IPv6, each mobile client is assigned a home subnetwork which comprises a home router 145, which maintains current location information of the client and which may route packets to the client at its current location. Other access routers 145 function as foreign routers, which a client can "visit" while away from its home subnetwork area. Whichever home router or foreign router a client 135 happens to be communicating with at a given time establishes a network link and provides network access to the client. Each of the clients and access routers in the network has a unique IP address just as in conventional fixed node data networks employing conventional Internet protocols.

Within the overall data network 100, two levels of handoff processes are contemplated. The first level is a macro-level handoff or an Layer 3 handoff, which involves change in location of a client such that it leaves one radio subnetwork served by one access router to go to another subnetwork served by another access router. Thus, through an L3 handoff, the client's network link necessarily changes. The next level is a micro-level handoff or an Layer 2 handoff, which involves a change in the location of a client within an AP subnetwork 150, in which case the client's radio link changes but network link does not change. The handling of L2 handoff is standard in wireless, cellular communication networks. For example, it is well known to use beacon signal strength from nearby APs for detecting reachability of the nearby APs.

FIG. 2 provides a simplified graphical illustration of mobile client L3 handoff process that is performed pursuant to Mobile IPv6. In the figure, the network 100 includes the network 120 and routers 145 connected to the network 120. A client 135 is originally located at a starting location A and moving toward a location C through an intermediary location B. In the example illustrated, the client 135 at the starting location A is operating within the foreign subnetwork served by the foreign router 145 (FR1) and connected to the network 120 via the FR1. On the other hand, the location C is located within the foreign subnetwork operated by the foreign router 145 (FR2). The mobile client 135 is traveling across the subnetwork operated by the FR1 and entering the subnetwork operated by the FR2. Thus, the L3 handoff contemplated in FIG. 2 takes place on the switching its network link from the FR1 to the FR2.

As the client moves from the starting location A and arrives at the intermediary location B, there comes a point where further wireless communication with the FR1 begins to fail. The client is leaving the subnet 150 operated by the FR1 and about to enter the subnet 150 operated by the FR2. As the client passes the intermediary location B, an L2 handoff occurs, so that the client's radio link changes from an AP in the subnet served by the FR1 to an AP in the subnet served by the FR2. As moving further towards the destination location C, the client performs an L3 handoff or Mobile IP registration with the FR2. The registration process begins with the Router Discovery prescribed in Mobile IPv6. Through the Router Discovery process, the client locates nearby access routers, determine their link-layer addresses and maintain reachability information about the paths to the routers. For these purposes, Router Discovery defines, among other things, a pair of ICMP packet types, i.e., Router Solicitation and Router Advertisement. A Router Solicitation is sent out by a client to request nearby access routers to generate and return Router Advertisements. Access Routers advertise their presence by sending Router Advertisements either periodically or in response to a Router Solicitation from a client. Router Advertisements contain information for clients to configure Care of Addresses (CoA).

When receiving a Router Advertisement from the FR2, the client forms a CoA based on the information in the advertisement and configures itself with the (CoA). The client then registers the new CoA by sending the HR a binding update containing both the new CoA and the client's permanent home IP address. The HR then updates the routing information of the client in its binding cache, whereby an L3 link is established between client and FR2. Hereafter, packets transmitted to the home IP address of the client will be intercepted by the HR and tunneled by the HR to the FR2 and delivered to the client from the FR2. To eliminate packet latency caused by triangular routing of packets, the binding update is also sent to any correspondent node which will thereafter route packets directly to the client.

As the popularity of mobile data communication increases, so does the possibility that malicious clients may try to obtain network access. These malicious mobile clients may be free-loaders trying to access network resources under a fake or stolen identity. These clients are nothing but a threat to the orderly operation of networks. Thus, to screen out these malicious clients, clients seeking network access have to be authenticated before any network access is granted to it. Similarly, clients may want to authenticate access routers offering connectivity before beginning network access via these access routers. There may be a rogue access router among them which will eavesdrop the client's communication or divert the communication to somewhere else or just drop the communication. The present invention provides two-way security protocols for authenticating clients and access routers to each other so that both clients and access routers can identify such malicious clients and routers before the mobile clients start using the access routers as gateways and the access routers start providing forwarding service to the clients.

The security mechanism according to the present invention builds upon authentication, authorization and accounting (AAA) protocols. AAA protocols, such as RADIUS and DIAMETER, are in use within the Internet today to provide authentication, authorization and accounting services for dial-up computers. Such AAA administrative services, particularly the authentication service provided by the AAA servers, are equally valuable for Mobile IP. In fact, Mobile IP can be implemented on the AAA infrastructure with very little changes to their basic frameworks. For instance, clients in AAA protocols are considered mobile nodes in Mobile IP. Access routers in Mobile IP fit in the position of attendants in AAA protocols. By augmenting the functionality of mobile clients and access routers so that they can understand the AAA messages, it is then possible to implement Mobile IP on the AAA infrastructure.

Figure 3A:
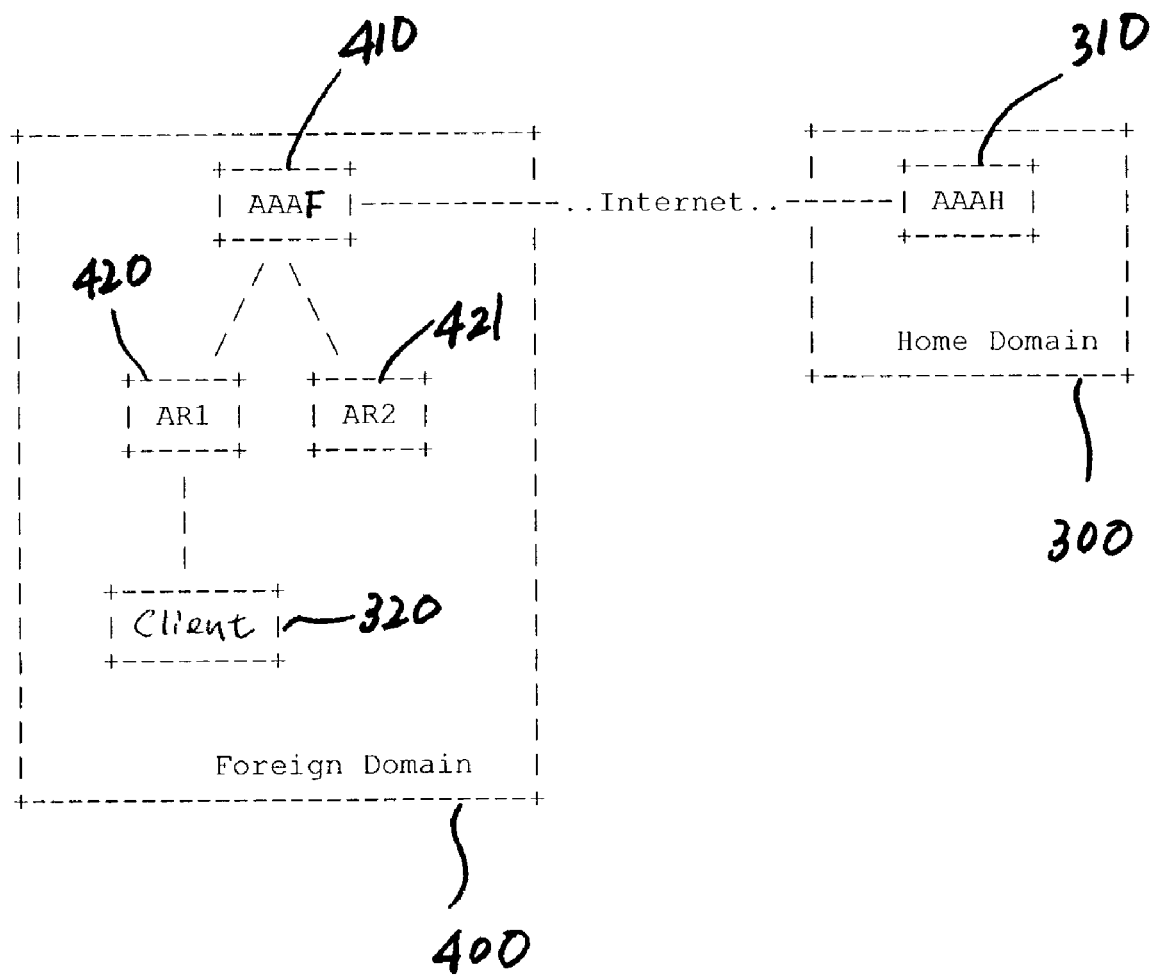
FIGS. 3A and 3B are simplified graphical representations showing a generic AAA network model on which authentication protocols according to the present invention are implemented.
Figure 3B:
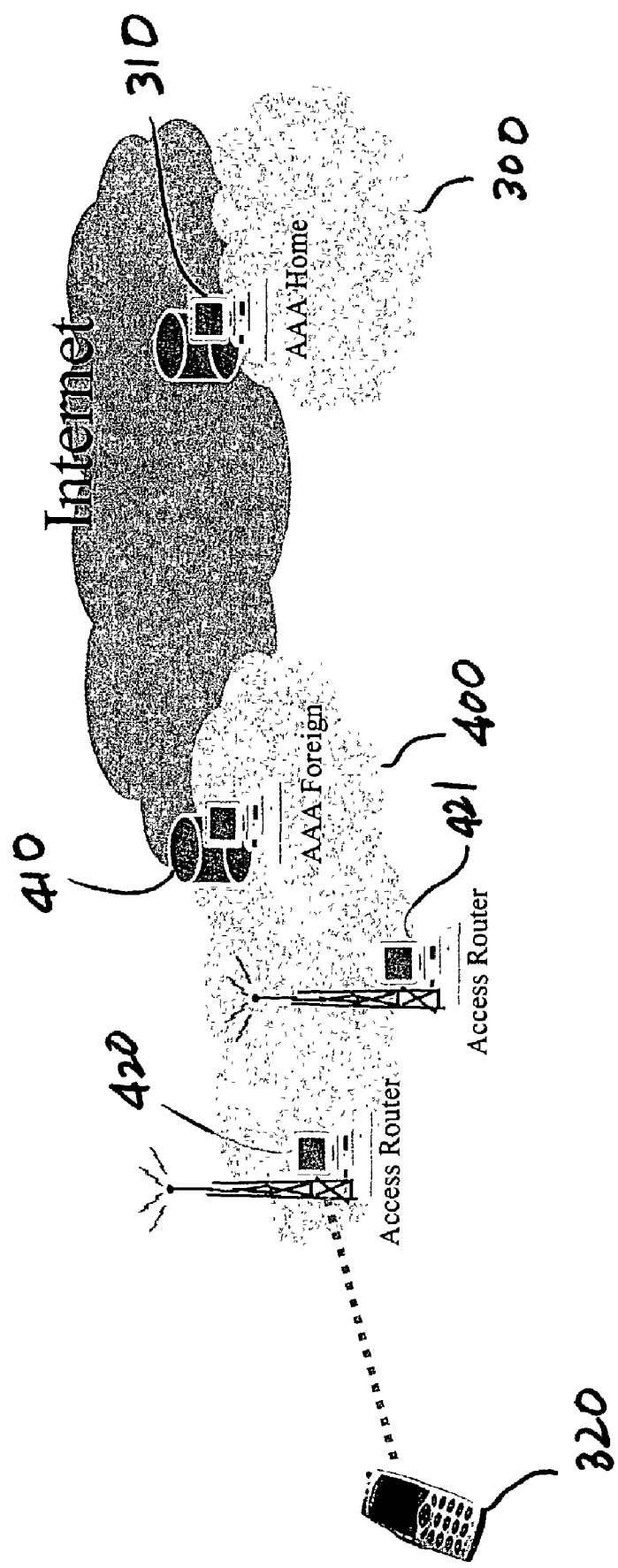

FIGS. 3A and 3B are simplified graphical representations showing a generic AAA network model on which NAS (Network Access Services) and Mobile IP are implemented. AAA protocols define administrative domains. An administrative domain consists of a network or a collection of networks operating under a common administration. Within the IP network 100 illustrated in FIG. 1, a number of administrative domains may be defined. But for simplicity, the AAA network, as shown in FIGS. 3A and 3B, is represented by only two administrative domains, i.e., home and foreign domains 300 and 400 separated by the wide-area Internet. Each of the domains comprises (Original) An AAA server for providing AAA services to constituents of its own domain. The home domain 300 is served by a home server AAAH 310. The foreign domain 400 is served by a foreign server AAAF 410. Each of the home and foreign domains further comprises attendants located within its domains, although FIGS. 3A and 3B show that only the foreign domain 400 has two attendants 420 and 421. Pursuant to AAA protocols, the attendants 420 and 421 provide the service interface between the client 320 and the local domain 400. It is assumed in this embodiment that the client 320 originated from the home domain 300 and has migrated into the foreign domain 400 and that the client 320 is now wishing to obtain service from either attendant 420 or 421 within the administrative domain 400. As mentioned above, Mobile IP is implemented on the AAA network illustrated in FIGS. 3A and 3B. From the Mobile IP perspective, the attendants 420 and 421 are in fact access routers (AR) for providing network access service to mobile clients. Therefore, the term "attendant" may be used interchangeably with the term "access router" or simply "AR."

One of the important services provided by AAA protocols is authentication. Generally, the AAA authentication mechanism works in such a way that a first AAA entity wishing to communicate with a second entity presents a credential to the second entity, and communication is allowed to begin between the two entities only when the second entity can successfully validate the credential of the first entity. Validation of the credential is conducted, using a key algorithm defined in a security association (SA) established between the two entities. AAA protocols are designed to work with different key algorithms. Some algorithms rely on the existence of a public key infrastructure while others rely on distribution of symmetric keys. AAA servers function as key distribution centers and at the request of AAA entities, such as attendants and clients, create and distribute keys for use in validating credentials presented between two AAA entities. A distribution of keys to two AAA entities creates a security association between them. It is assumed for the description purpose only that the AAA network shown in FIGS. 3A and 3B adopts a symmetric key or shared secret key algorithm. The symmetric key algorithm is easier to deploy than any other key algorithms and thus provides solutions for Internet-wide applicability. However, those skilled in the art will appreciate that other key algorithms, such as asymmetric key algorithms such as a public key scheme, may also be adopted in implementation of the present invention. The use of authentication tokens may be another alternative.

Figure 4:
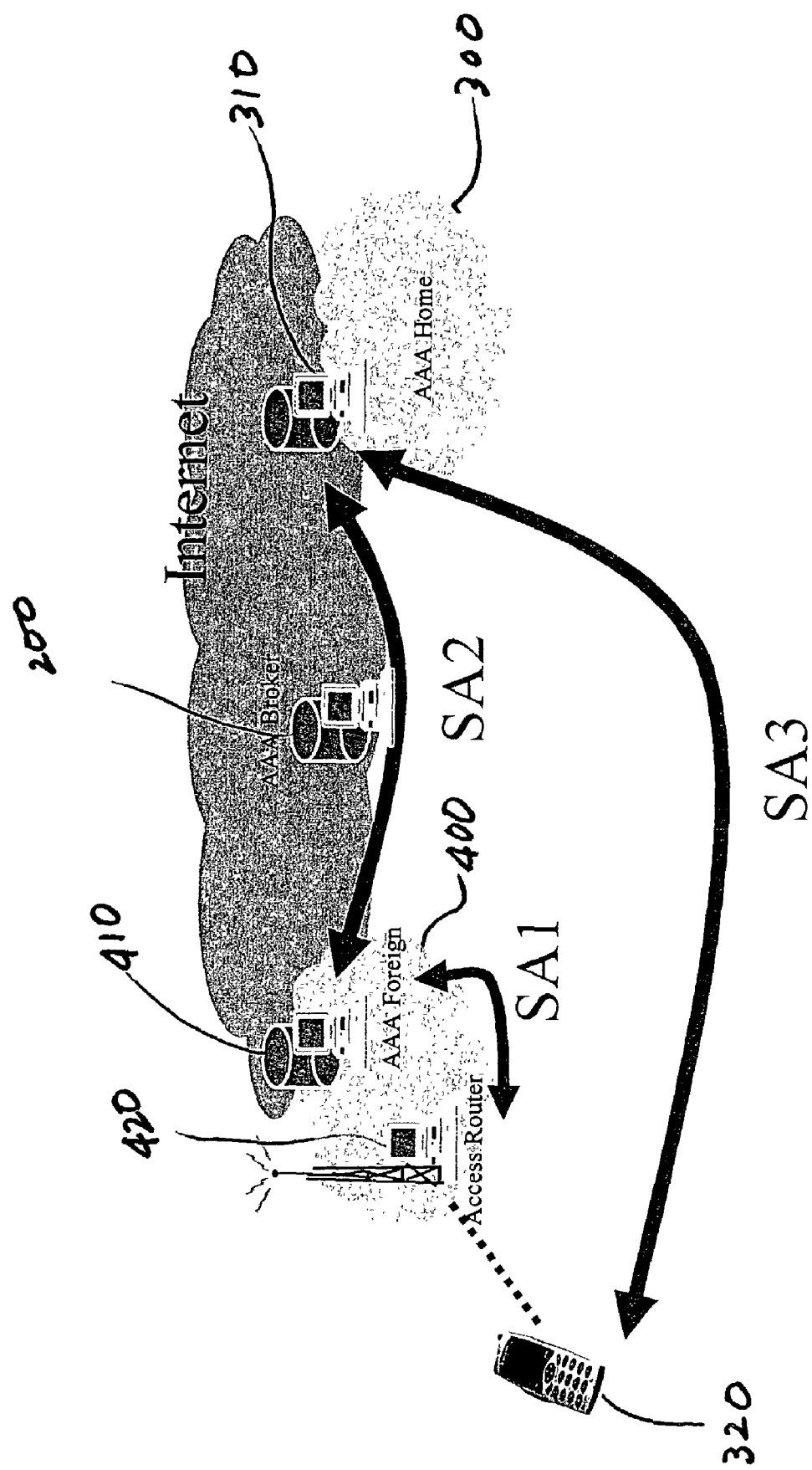
FIG. 4 is a graphical illustration showing pre-established security associations implicit in the network shown in FIGS. 3A and 3B.

There is a security model implicit in the AAA network shown in FIGS. 3A and 3B. FIG. 4 shows such an implicit security model in which arrows indicate pre-established security associations assumed from the beginning. First, it is assumed that there is a security association established between AAAF 410 and ARs 420 and 421 as indicated by Arrow SA1. It is fair to assume that the ARs 420 and 421 and the AAAF 410 have the pre-established SA1 between them because the ARs are located in the domain served by the AAAF 410, and there should have been trust already established between them. Next, it is assumed that there is a security association established between AAAH 310 and AAAF 410. These AAA servers do not need to have a pre-established security association between them initially but must have the ability to negotiate a security association with each other when necessary. This security association, which is indicated by Arrow SA2, can be established directly between the two AAA servers or indirectly through a broker AAA server 200. Lastly, it is assumed that there is a security association established between client 320 and AAAH 310, which is indicated by Arrow SA3. Pre-establishment of the SA3 is a fair assumption because the client 320 originated from the home domain 300 in which the AAAH 310 is located. Thus, the AAAH 310 is the only entity that can authenticate the client initially.

An important feature of the present invention is that the present invention uses Router Discovery mechanism as a "carrier" for implementing the AAA security protocols in a Mobile IP setting. In the present invention, Router Solicitation and Router Advertisement are extended to provide Mobile IP authentication functionality to the existing AAA protocols.

Initial Router Discovery (Entering a New Domain)

Figure 5A:
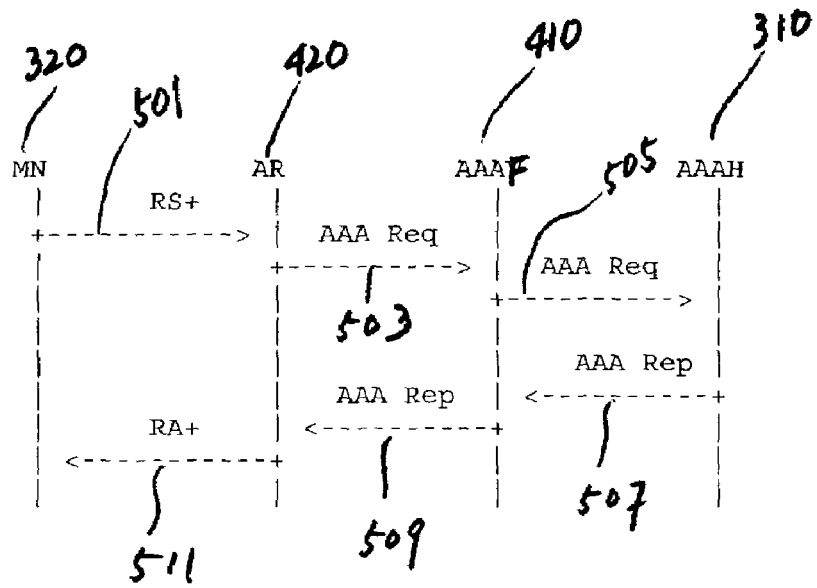
FIG. 5A is a flow chart illustrating a authentication protocol using Router Discovery mechanism, according to an embodiment of the invention, in which the identity of a mobile client is verified by its home server.
Figure 5B:
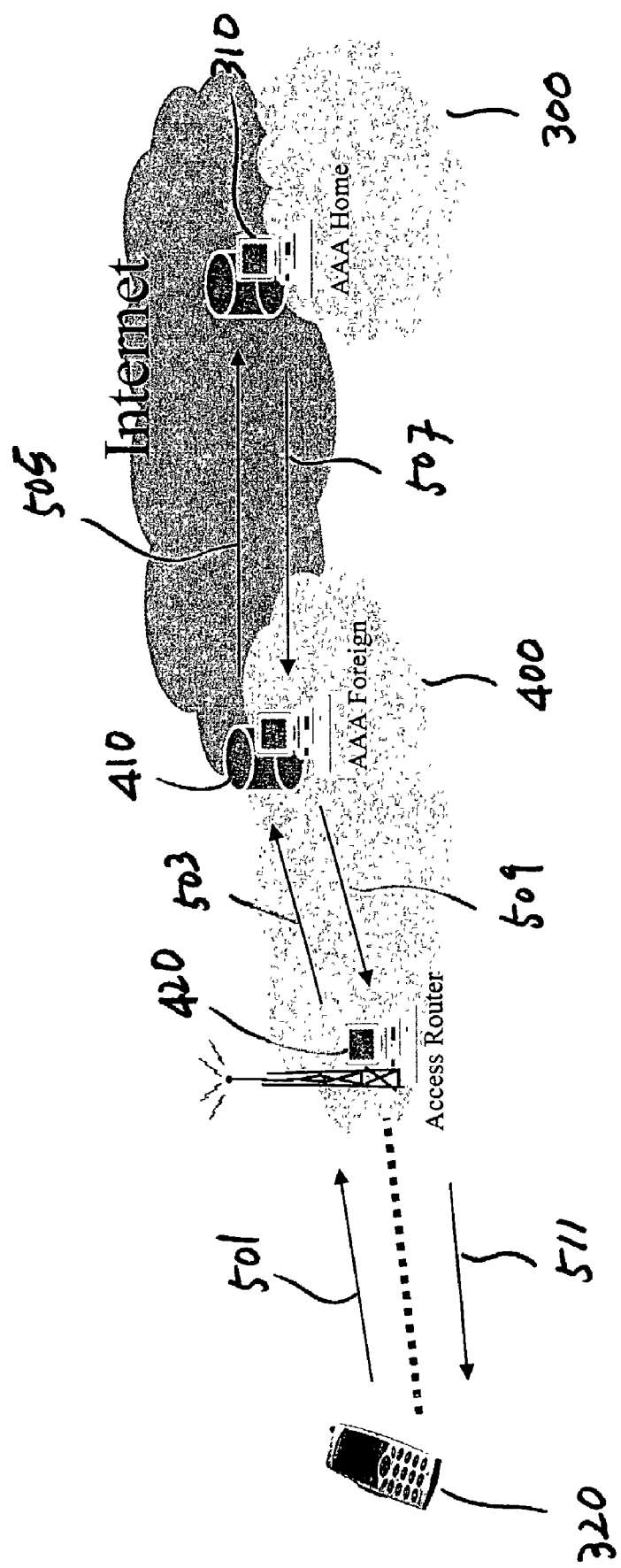
FIG. 5B is a simplified graphical representation of the process flow illustrated in FIG. 5A.

FIG. 5A is a flow chart that illustrates a network access authentication using router discovery protocol, according to an embodiment of the present invention. FIG. 5B is a simplified graphical representation of the process flow illustrated in FIG. 5A. In this embodiment, it is assumed that the client 320 does not have any security association either with AR 420 or 421 or with the AAAF 410. In other words, it is assumed that the client 320 has never visited the foreign domain 400 before or has been out of the foreign domain long enough that the prior security associations with the ARs 420 and 421 and the AAAF 420 have all expired.

The client 320 enters the foreign domain 400 and requests service by an on-link access router for network access. In Step 501, the client 320 begins router discovery by sending out an extended Router Solicitation message (RS+). This is a multicast message which is received by all access routers on the same link as the client. Unlike a regular router solicitation message, this one includes the proof of client's identity. This proof is carried in the form of extensions to the standard router solicitation packet. The extended Router Solicitation (RS+) includes various components such as a standard router solicitation message (RS). The RS+ also carries the client's identifier (client_id), which can be a network access identifier (NAI) or an IP address, and a signature of the client. The signature is a digest of the extended Router Solicitation (RS+) encrypted by a secret key of the client (client-AAAH_key) shared with the AAAH 310. Thus, the extended Router Solicitation (RS+) may be expressed by:

RS+client_id+signed by client.

The client's shared secret key is defined by the security association SA3 (see FIG. 4) established between client 320 and AAAH 410. Thus, the AAAH 410 has the client's shared secret key (client-AAAH_key) to verify the client's signature stored in the extended Router Solicitation (RS+). The AR 420 and other attendants receive the extended Router Solicitation (RS+) from the client 320. As assumed above, however, since the AR 420 does not have a security association with the client 320, it does not have the shared secret key to verify the identity of client 320. According to the standard Router Discovery mechanism, access routers return Router Advertisements in response to a Router Solicitation. However, in the present invention, the AR 320 and other access routers will not return Router Advertisements until the client 320 is successfully authenticated.

The AR 420 then delegates the verification of client 320 to the AAAF 410. The AR 420 prepares an AAA Request (AAA Req) and sends it to the AAAF 410 (Step 503). The AAA Req carries a copy of the entire extended Router Solicitation (RS+) from the client 320. The AAA Req sent from the AR 420 to the AAAF 410 is protected according to the security association SA1 established between them. The AAA Req message is prepared according to an AAA protocol, such as Radius or DIAMETER. Preferred procedures for preparing AAA messages are discussed in IETF draft documents, "Diameter Base Protocol" <draft-ietf-aaa-diameter-07.txt> and "Diameter Mobile IP extensions" <draft-calhoun-diameter-mobileip-12.txt>, both of which are incorporated herein by reference.

As assumed above, the AAAF 410 does not have a security association with the client 320 and thus does not have the client's shared secret key to verify the identity of the client. But the identifier of the client stored in the RS+ indicates to the AAAF 410 that the client 320 has originated form the domain 300. The AAAF 410 then forwards the AAA Req, along with a copy of the RS+, to the AAAH 310 located in the domain 300 (Step 505), using the security association SA2 established with the AAAH 310.

When receiving the AAA Req from the AAAF 410, the AAAH 310 verifies the identity of client 320 by decrypting the client's signature stored in the AAA Req, using the client's share secret key. If the client holds out the true identity, the AAAH 310 should be able to successfully verify the identity of client. If the AAAH 310 fails to verify the client's identity, it prepares an AAA Reply (AAA Rep) and sends it to the AR 420 through the AAAF 410. The AAA Rep includes the authentication result indicating that the AAAH failed to authenticate the client 320. The AAA Rep message is likewise prepared according to an AAA protocol, such as Radius or DIAMETER. When receiving the AAA Rep, the AR 420 just ignores the Router Solicitation from the client and will not return a Router Advertisement, whereby unauthenticated mobile clients are prevented from having access to network resources.

If the AAAH 310 successfully verifies the identity of client 320, the AAAH 310 replies to the AAA Req from the AAAF 410 by preparing an AAA reply (AAA Rep) and transmitting it to the AAAF 410 (Step 507). This AAA Rep carries two shared secret keys: one to be used between client 320 and AR 420; and the other to be used between client 320 and AAAF 410. These shared secret keys are produced by the AAAH and to be delivered to the AAAF 410, AR 420 and the client 320 to establish a security association between client 320 and AAAF 410 and between client 320 and AR 420. Each of the secret keys (client-AR_key) and (client-AAAF_key) is duplicated. The duplicates (client-AR_key and client-AAAF_key) are encrypted by the AAAH 410, using the secret key (client-AAAH_key) shared with the client 320, to protect their authenticity and confidentiality and delivered to the client 320. The original keys (client-AR_key and client-AAAF_key) are unencrypted and delivered to the AR 420 and the AAAF 410, respectively. Thus, the AAA Rep from the AAAH 310 to the AAAF 410 may be expressed by:

client-AR_key+client-AAAF_key+(client-AR_key+ client-AAAF_key) encrypted by AAAH.

This AAA Rep from the AAAH 310 informs the AAAF 410 that the client 320 is trustworthy. The AAAF 410 then extracts the unencrypted share secret key (client-AAAF_key) from the AAA Rep and stores it in its cache. The shared secret key extracted is going to be used by the AAAF 410 to authenticate messages from the client 320. The AAAF 410 then forwards the AAA Rep to the AR 420 (Step 509). The AAA Rep from the AAAF 410 informs the AR 420 that the identity of client 320 has been successfully authenticated. The AR 420 then extracts the unencrypted shared secret key (client-AR_key) from the AAA Rep and stores it in its cache. This shared secret key is going to be used by the AR 420 to authenticate messages from the client 320. The AR 420 then prepares an extended Router Advertisement (RA+) and unicasts it to the client 320 (Step 511). The extended Router Advertisement (RA+) includes a standard Router Advertisement message (RA), the identification of AR 420 (AR_id) and the shared secret keys (client-AR_key and client-AAAF_key) encrypted by the shared secret key (client-AAAH_key). It further includes a signature of the AR. The signature is a digest of the RA+ encrypted by the shared secret key (client-AR_key), which the AR just received from the AAAF 410. Thus, the extended Router Advertisement may be expressed by:

RA+AR_id+(client-AR_key+client-AAAF_key) encrypted by AAAH+signed by AR.

Figure 6:
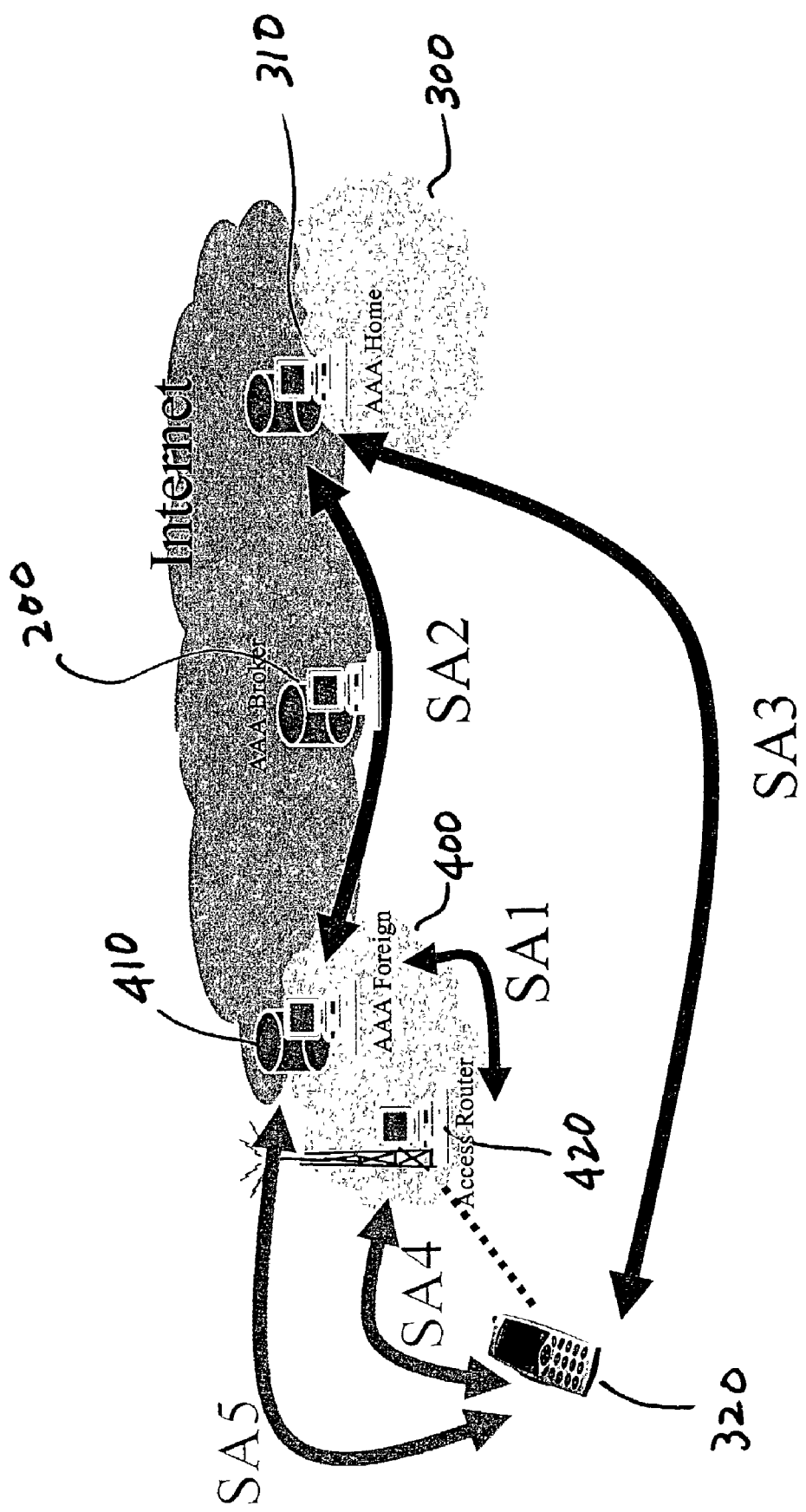
FIG. 6 is a graphic illustration showing new security associations established between client and access router (SA4) and between client and AAAF (SA5) after the authentication protocol shown in FIGS. 5A and 5B is performed.

When receiving the extended Router Advertisement (RA+) from the AR 420, the client 320 verifies the authenticity of the received router advertisement. The client 320 first decrypts the shared secret keys (client-AR_key and client-AAAF_key), using the secret key shared with the AAAH 310 (client-AAAH_key). If these secret keys are successfully decrypted, the client 320 can trust the secret keys because they are certified by the AAAH 310, which the client trusts. Next, the client, using the decrypted secret key (client-AR_key), decrypts the signature of the AR 420. If the signature is successfully decrypted, the client 320 can trust the AR 420 because the identity of the AR is verified by the secret key (client-AR_key), which the client now trusts. Also, successful decryption of the signature assures the client of the authenticity of the extended Router Advertisement (RA+). With the shared secret key (client-AR_key), which is distributed to the client 320 and the AR 420, a new security association SA4 (FIG. 6) is established between client 320 and AR 420. With the shared secret key (client-AAAF_key), which is distributed to the client 320 and the AAAF 410, a new security association SA5 is established between client 320 and AAAF 410.

If the client 320 fails to authenticate the signature of the AR 420, the client 320 just ignores the Router Advertisement from the AR 420 and waits for Router Advertisements from other access routers that carry verifiable signatures. By doing so, the client 320 is prevented from being lured to begin network access via an illegitimate access router.

The authentication process shown in FIGS. 5A and 5B probably takes long time and causes significant communication latency. A major component of this communication latency is the time taken for the AAA messages to traverse the wide-area Internet that separates the AAAF 410 and the AAAH 310. Anytime an AAA message has to travel to the AAAF or the AAAH, there is certain latency involved. In the initial authentication process as shown in FIGS. 5A and 5B, it is inevitable to communicate with these remote servers. However, if the AR and the AAAF are able to authenticate the client without consulting the AAAF or the AAAH, then the latency involved in this authentication mechanism will be reduced.

Subsequent Router Discovery (New Access Router, Same Domain)

Figure 7A:
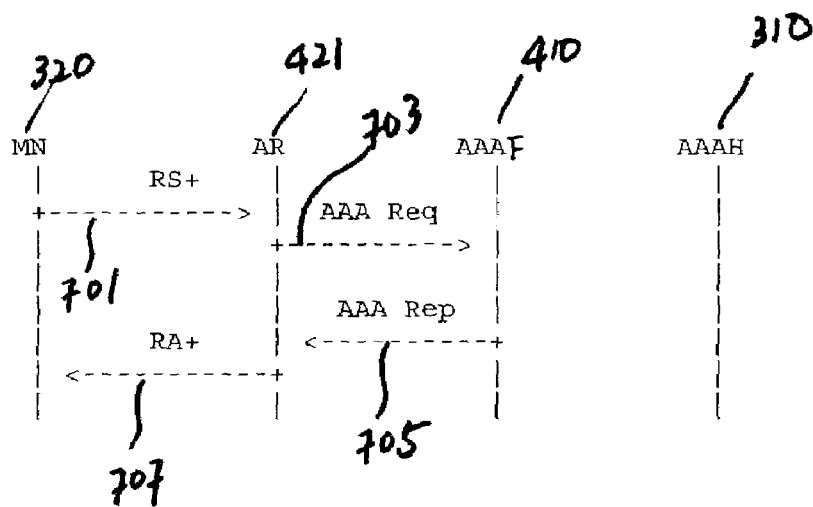
FIG. 7A is a flow chart that illustrates an authentication protocol according to another embodiment of the invention in which the identity of a mobile client is verified by a foreign server.
Figure 7B:
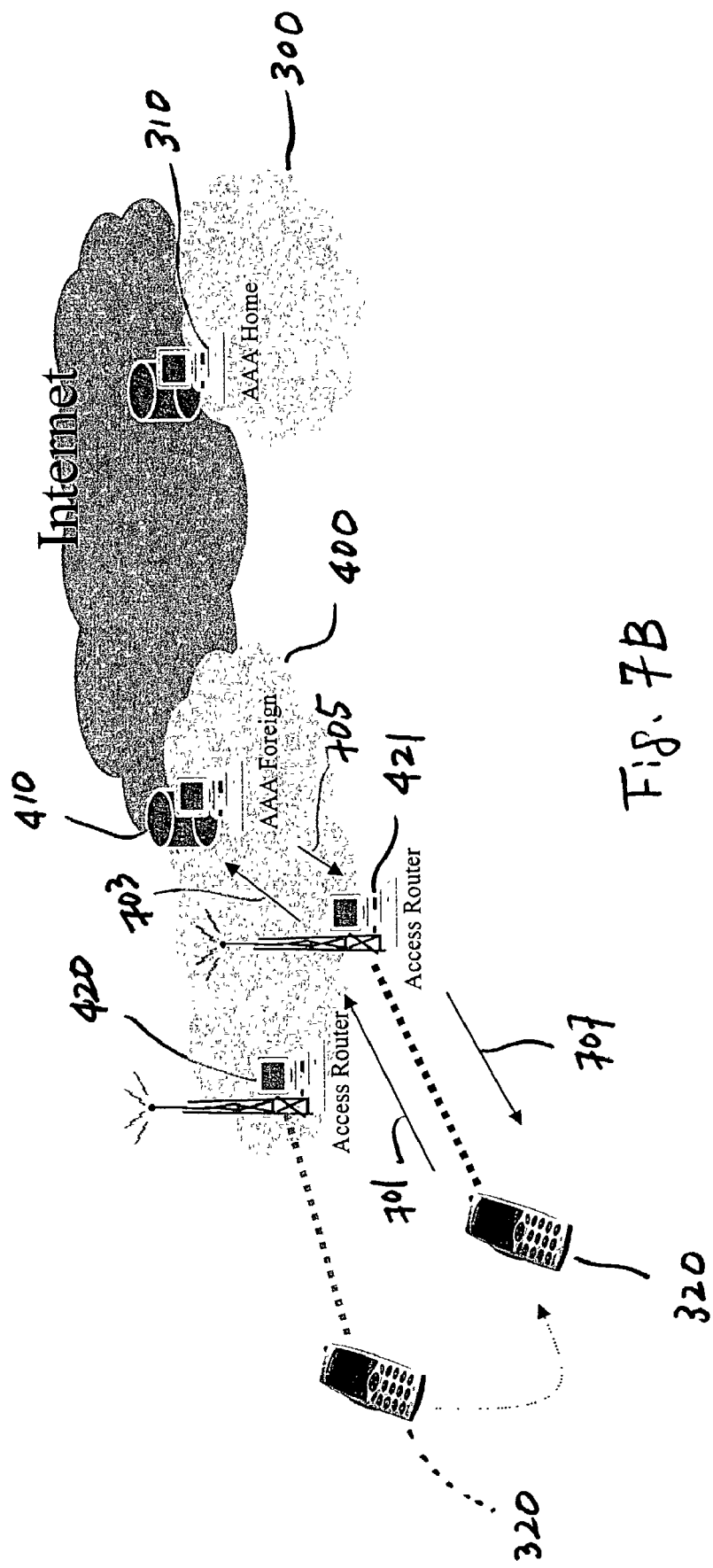
FIG. 7B is a simplified graphical representation of the process flow illustrated in FIG. 7A.

The client may move within the domain 400 and attach to another access router which is not aware of client's identity. FIG. 7A is a flow chart that illustrates an authenticated router discovery performed in such a case, according to another embodiment of the invention. FIG. 7B is a simplified graphical representation of the process flow illustrated in FIG. 7A. In FIGS. 7A and 7B, it is assumed that after the client 320 goes through the initial authentication process shown in FIGS. 5A and 5B with the AR 420, the client 320 leaves the subnet served by the AR 420 and enters the subnet served by the AR 421. To obtain network access though the AR 421, the client 320 again sends out an extended Router Solicitation (RS+) (Step 701). The extended Router Solicitation (RS+) sent out this time carries the same messages as used in the initial authentication process shown in FIGS. 5A and 5B and may be expressed by:

RS+client_id+signed by client.

However, since the signature in the extended Router Solicitation in this embodiment is encrypted by the shared key (client-AAAF_key), the AR 421 cannot verify the signature. The AR 421 then delegates the verification of client 320 to the AAAF 410 by preparing and sending an AAA Req to the AAAF (Step 703). The AAA Req from the AR 421 includes a copy of the entire RS+. The AAAF 410 should be able to recognize the identify of client 320 because it has obtained the share secret key (client-AAAF_key) from the previous authentication process shown in FIGS. 5A and 5B. Without consulting the AAAH 310, the AAAF 410 verifies the identity of the client by decrypting the client's signature, using the shared secret key (client-AAAF_key). If the AAAF 410 fails to verify the client's signature, the AAAF 410 prepares an AAA Rep and sends it to the AR 421 (Step 705) to notify the AR 421 that the client 320 cannot be trusted. The AR 421 then ignores the Router Solicitation from the client 320. If the client's signature is successfully verified, the AAAF 410 generates a secret key (client-AR2_key) to be shared between the client 320 and the AR 421. The secret key (client-AR2_key) is then duplicated. One is unencrypted, but the other is encrypted by the share secret key (client-AAAF_key). The AAAF 410 stores the unencrypted key and the encrypted key in an AAA Rep and sends it to the AR 421 (Step 705). Thus, the AAA Rep from the AAAF 410 to the AR 421 may be expressed by:

client-AR2_key+(client-AR2_key) encrypted by AAAF.

The AAA Rep from the AAAF 410 informs the AR 421 that the client 320 can be trusted. The AR then extracts the unencrypted secret key (client-AR2_key) and stores in its cache. This stored secret key is going to be used by the AR 421 to authenticate future messages from the client 320. The AR 421 then prepares an extended Router Advertisement (RA+) and unicasts it to the client 320 (Step 707). The extended Router Advertisement from the AR 421 may be expressed by:

RA+AR_id+(client-AR2_key) encrypted by AAAF+ signed by AR.

When receiving the Router Advertisement (RA+) from the AR 421, the client 320 first decrypts and extracts the secret key (client-AR2_key), using the shared secret key (client-AAAF_key). If the key is successfully decrypted, the client 320 may trust the key. Using the shared secret key (client-AR2_key), the client then verifies the authenticity of the RA+ by decrypting the signature of the AR 421. If the signature is successfully decrypted, the client 320 can trust the AR 421 and the authenticity of the RA+. With the shared secret key (client-AR2_key), which is distributed to the client 320 and the AR 421, a new security association is established between them. If the client fails to decrypt the signature, the client ignores the Router Advertisement from the AR 421 and waits for Router Advertisements from other access routers that carry verifiable signatures.

The subsequent authentication process shown in FIGS. 7A and 7B is faster to perform, compared to the process shown in FIGS. 5A and 5B because the authentication process shown in FIGS. 7A and 7B does not require exchange of messages with the AAAH 310 and thus consists of a shorter round trip for protocol signaling.

Subsequent Router Discovery (Same Access Router)

Figure 8A:
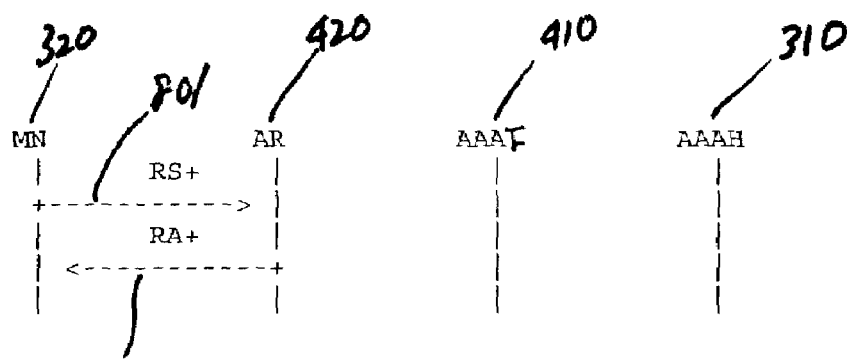
FIG. 8A is a flow chart that illustrates an authentication protocol according to another embodiment of the invention in which client and access router are re-authenticated.
Figure 8B:
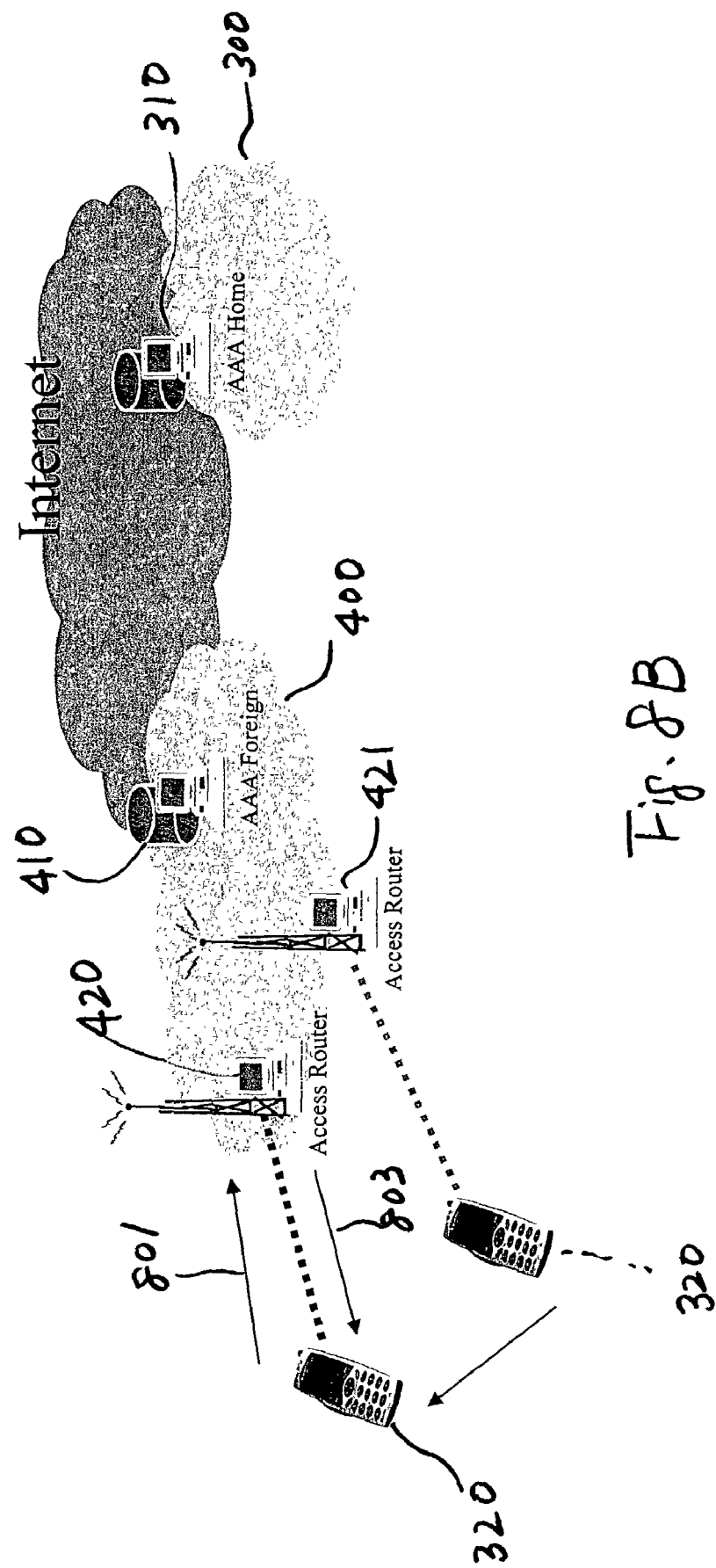
FIG. 8B is a simplified graphical representation of the process flow illustrated in FIG. 8A.

Each Router Advertisement has a lifetime. Thus, even if a client is still attached to the same access router, the client has to go through an authentication process with the same access router before the lifetime of the previous Router Advertisement expires. In such a case, however, the authentication process according to the present invention takes the shortest round trip for protocol signaling as shown in FIGS. 8A and 8B. In FIGS. 8A and 8B, the client 320 in Step 801 sends out an extended Router Solicitation to the AR 420. The extended Router Solicitation may be expressed by:

RS+client_id+signed by client.

The signature is encrypted by the shared secret key (client-AR_key), which the client has obtained from the previous initial authentication process shown in FIGS. 5A and 5B. The AR 420 should be able to recognize the identity of the client because it shares the same key with the client 320. Without consulting the AAAF 410, the AR 420 verifies the identity of client 320 by decrypting the signature, using the shared secret key (client-AR_key). If the AR 420 fails to verify the identity of the client, it just ignores the Router Solicitation. If the AR 420 successfully verifies the client's identity, it prepares an extended Router Advertisement (RA+) and unicasts it to the client 320. The extended Router Advertisement (RA+) in this embodiment may be expressed by:

RA+AR_id+signed by AR.

Thus, this communication between client 320 and AR 420 provides a fastest authentication mechanism because it involves the shortest round trip for protocol signaling.

Unsolicited Router Advertisements

Figure 9:
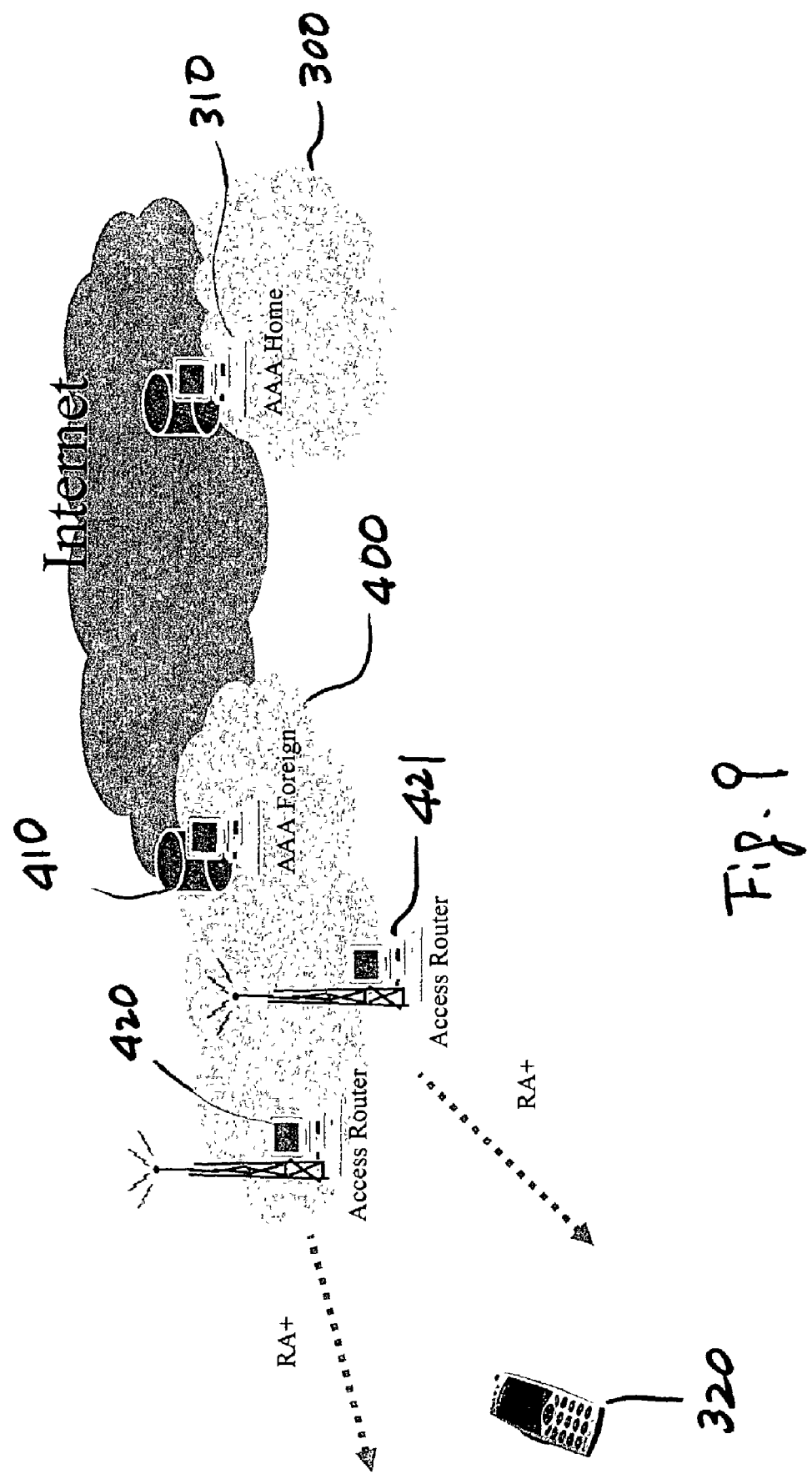
FIG. 9 is a simplified graphical representation showing another embodiment of the present invention in which access routers voluntarily send out their Router Advertisements.

Access routers may periodically send Router Advertisements, instead of waiting to receive a verifiable Router Solicitation. It is assumed in FIG. 9 that the ARs 420 and 421 unicast their extended Router Advertisements (RA+) periodically. These extended Router Advertisements may be expressed by:

RA+AR_id+signed by AR.

The extended Router Advertisements sent from the AR 420 contain a standard Router Advertisement message (RA) and a signature of AR 420. The extended Router Advertisements sent from the AR 421 contain a standard Router Advertisement message (RA) and a signature of AR 421. It is assumed that the client 320 has previously gone through the initial authentication process shown in FIGS. 5A and 5B with the AR 420. Through this previous authentication process, there are a security association established between client 320 and AR 420 and between client 320 and AAAF 410. If the extended Router Advertisements from the AR 420 reach the client 320, the client 320 should be able to authenticate the router advertisement messages. Thus, the client 320 can safely choose to begin network access via the AR 420. If the client does not recognize any of the Router Advertisements it receives, the client will have to go through the initial authentication process shown in FIGS. 5A and 5B by sending out extended Router Solicitations.

Re-Authentication

At any time either of client and AR which are in communication may start the authentication process according to the present invention to re-authenticate each other. This is important because there is always the possibility that malicious entities may replace legitimate ones even during communication. The client may start this process by sending an extended Router Solicitation (RS+) at any time during communication with the AR. The AR should be able to respond to the RS+ by returning to the client its extended Router Advertisement (RA+) for re-authentication by the client. Likewise, the AR, while serving a client, can re-authenticate the client. The AR begins the re-authentication of the client by sending the client a unicast Router Advertisement with a very low router lifetime. A very low router lifetime indicates to the client that the AR is about to stop serving the client. The client responds to such a Router Advertisement by sending out a RS+ to discover other available routers on the same link. The AR then authenticates the RS+ sent from the client.

Interoperation with Old Protocol

Within an overall network, domains may jointly exist that can support the extended Router Discovery according to the present invention and support only the standard Router Discovery. Thus, there may a situation where a client that supports only the standard Router Discovery happens to migrate into a domain that supports the extended Router Discovery according to the present invention. Or a client that supports the extended Router Discovery migrates into a domain that supports only the standard Router Discovery. In either situation, the authentication protocol according to the present invention will not interfere with the operation of the standard Router Discovery.

First, in a situation where a client that supports the extended Router Discovery tries to obtain connectivity service within a domain that supports only the standard Router Discovery, the client sends out an extended Router Solicitation (RS+). However, nearby access routers cannot recognize new extensions attached to the Router Solicitation and thus will ignore these extensions. The access routers will process the extended Router Solicitation (RS+) as a standard Router Solicitation (RS) and send back a standard Router Advertisement (RA). Now it is up to the client to decide whether to use this "unauthenticated" advertisement or not.

In the next situation where a client that supports only the standard Router Discovery tries to obtain service within a domain that supports the extended Router Discovery according to the present invention, the client sends a standard Router Solicitation (RS) that does not include any of the new extensions. Upon receiving such an "unauthenticated" solicitation, it is up to nearby access routers whether to send back an extended Router Advertisement (RA+) or not to respond at all.

In either case, client and AR that support the extended Router Discovery according to the present invention can detect whether the other side of the communication can support the extended Router Discovery or only the standard Router Discovery, and respond accordingly. Whether to respond to or accept unauthenticated messages is a policy decision.

Protection Against Replay Attack

A replay attack is simply a replay of a stolen password. If a cracker can listen in when a password is being transmitted, the cracker then has a copy of your password that can be used at any time in the future. Even if the password is communicated in encrypted form, the cracker may be able to log in by simply replaying a previously captured communication. With addition of challenge extensions, the authentication protocol according to the present invention can provide protection against replay attacks.

Figure 10:
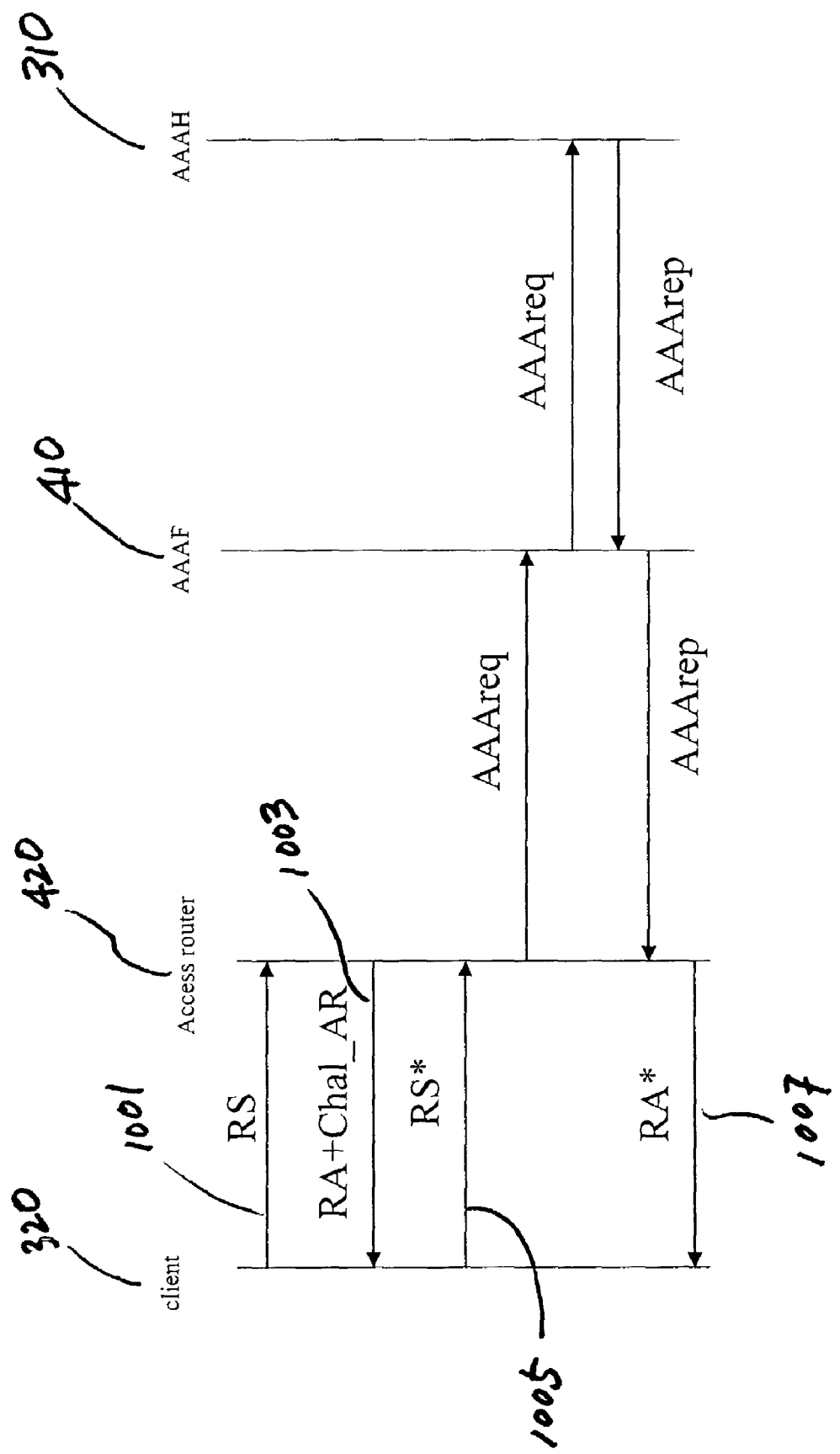
FIG. 10 is a flow chart illustrating an authentication protocol using Router Discovery mechanism, according to an embodiment of the invention, in which solicitation and advertising message contain a challenge to provide protection against replay attacks.

FIG. 10 is a flow chart showing an embodiment of the present invention in which a challenge scheme is used to provide protection against replay attacks. In FIG. 10, it is assumed that the client 320 has never communicated with the AR 420 or the AAAF 410, and thus the client 320 has to go though the initial authentication process as shown in FIGS. 5A and 5B. First, the client 320 sends out a standard Router Solicitation (RS) (Step 1001). The AR 420 receives the Router Solicitation, but cannot trust it until the identity of client sending the solicitation message is authenticated. The client sending the solicitation message may be a malicious node that has monitored past communication of the client 320 and stolen the identity of the client 320 in order to obtain network access under the false ID.

In return to the Router Solicitation (RS) from the client 320, the AR 420 challenges the identity of the client and the authentication of the solicitation message (Step 1003). Specifically, in Step 1003, the AR 420 unicasts a Router Advertisement (RS), along with a challenge extension, to the client 320. The challenge extension includes a random number generated by the AR 420. Triggered by the Router Advertisement from the AR 420, the client prepares and sends an extended Router Solicitation (RS*) (Step 1005). The extended Router Solicitation includes a standard Router Solicitation (RS), the identification of the client, i.e., the client's IP address or NAI, and a request for a secret key to be shared with the AR 420 to establish a security association with the AR 420. The extended Router Solicitation (RS*) further includes two challenge extensions. One challenge extension includes a copy of the challenge that the client just received from the AR in Step 1003. The second challenge extension includes a random number generated by the client itself. Lastly, the RS* includes an authentication extension including a signature of the client 320 that is encrypted, using a secret key shared between client 320 and AAAH 310 (client-AAAH_key). Thus, in this embodiment, the extended Router Solicitation (RS*) may be expressed by:

RS+client_id+client-AR_key_request+Chal_AR+
Chal_client+signed by client.

When receiving the RS* from the client 320, the AR 420 first checks the challenge extension Chal_AR to see if the random number in the extension is the same as the number that it sent to the client right in Step 1003. If the random number is the same, it is the case that the RS* is in fact a response to the challenge that the AR 420 sent to the client 320 in Step 1003. If the numbers do not match, the AR 420 must ignore the RS* because the RS* is probably from a malicious node that is pretending to be the client 320 with a stolen ID. If the numbers match, the subsequent authentication process will be the same as previously described with FIGS. 5A and 5B.

If the identity of the client 320 is successfully verified by the AAAH 310, the AR 420 prepares and unicasts an extended Router Advertisement (RA*) to the client 320 (Step 1007). In this embodiment, the extended Router Advertisement (RA*) includes a standard Router Advertisement and a secret key (client-AR_key) to be shred between client 320 and AR 420. The secret key has been generated by the AAAH 310. As already discussed, the key is encrypted, using the secret key (client-AAAH_key) shared between client 320 and AAAH 310. The RA* further includes two challenge extensions. One extension includes a copy of the random number that the AR 420 received from the client in Step 1005. The other challenge extension includes a new random number generated by the AR 420, which will be used in a next communication between client 320 and AR 420. The RA* also has an authentication extension that includes a signature of the AR 420 that is encrypted, using the newly distributed shared secret key (client-AR_key). Thus, the extended Router Advertisement in this embodiment may be expressed by:

RA+AR_id+client_AR_key_reply+Chal_client+Chal_AR+signed by AR.

When receiving the RA* from the AR 420, the client 320 first checks the challenge extension (Chal_client) to see if the random number in the extension is the same as that the client sent to the AR in Step 1005. If the numbers do not match, the client must disregard the RA* because it may be the case that a malicious access router is pretending to be the AR 420 with the stolen ID. If the numbers match, the client 320 extracts the number in the challenge extension (Chal_AR) and stores in its cache for future communication with the AR 420. The client 320 then decrypts the key reply (client_AR_key_reply) to extract the secret key (client-AR_key) shared with the AR, using the secret key (client-AAAH_key) shared with the AAAH 310. Using the extracted shared secret key, the client then verifies the signature of the AR 420.

Figure 11:
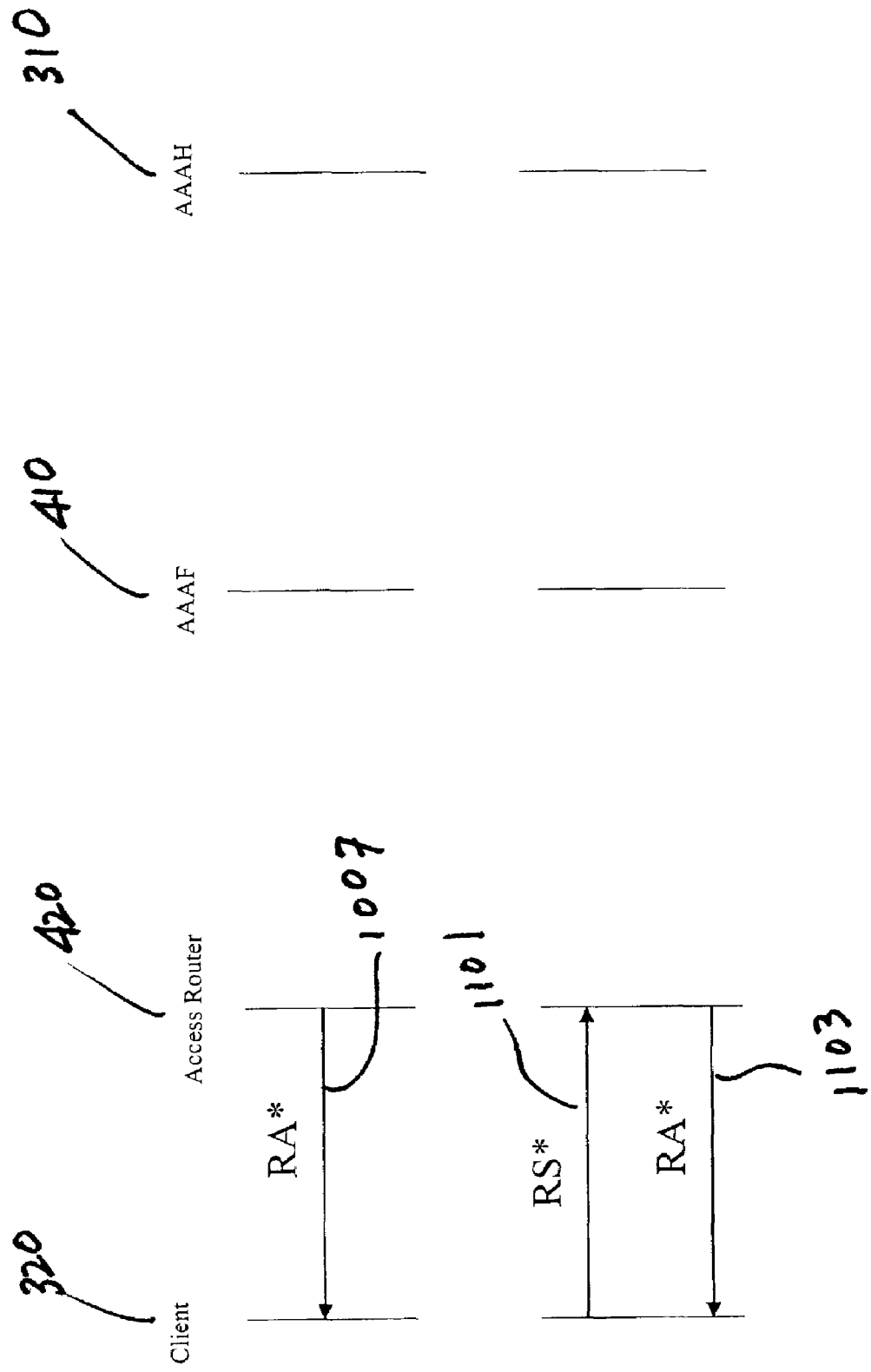
FIG. 11 is a flow chart illustrating another example of authentication protocol performed in the embodiment of the invention as shown in FIG. 10 in which client and access router are re-authenticated.

After the initial authentication process as shown in FIG. 10 is performed, i.e., after a security association is established between client 320 and AR 420, the client and the AR may re-authenticate them to each other. FIG. 11 shows an example of such a re-authentication process. The re-authentication process is initiated by the client 320, which sends out an extended Router Solicitation (RS*) (Step 1101). In return, the AR 420 unicasts an extended Router Advertisement (RA*) (Step 1103). Since a security association has already been established between client 320 and AR 420, the RS* may be expressed as follows:

RS+client_id+Chal_AR+Chal_client+signed by client.

The challenge extension (Chal_AR) in the RS* contains the random number copied from Step 1007. The challenge extension (Chal_client) contains a new random number generated by the client.

The RA* may be expressed by:

RA+AR_id+Chal_client+Chal_AR+signed by AR.

The challenge extension (Chal_client) in the RA* contains the random number copied from Step 1101. The challenge extension (Chal_AR) contains a new random number generated by the AR.

Authentication Using Asymmetric Key Scheme

Figure 12:
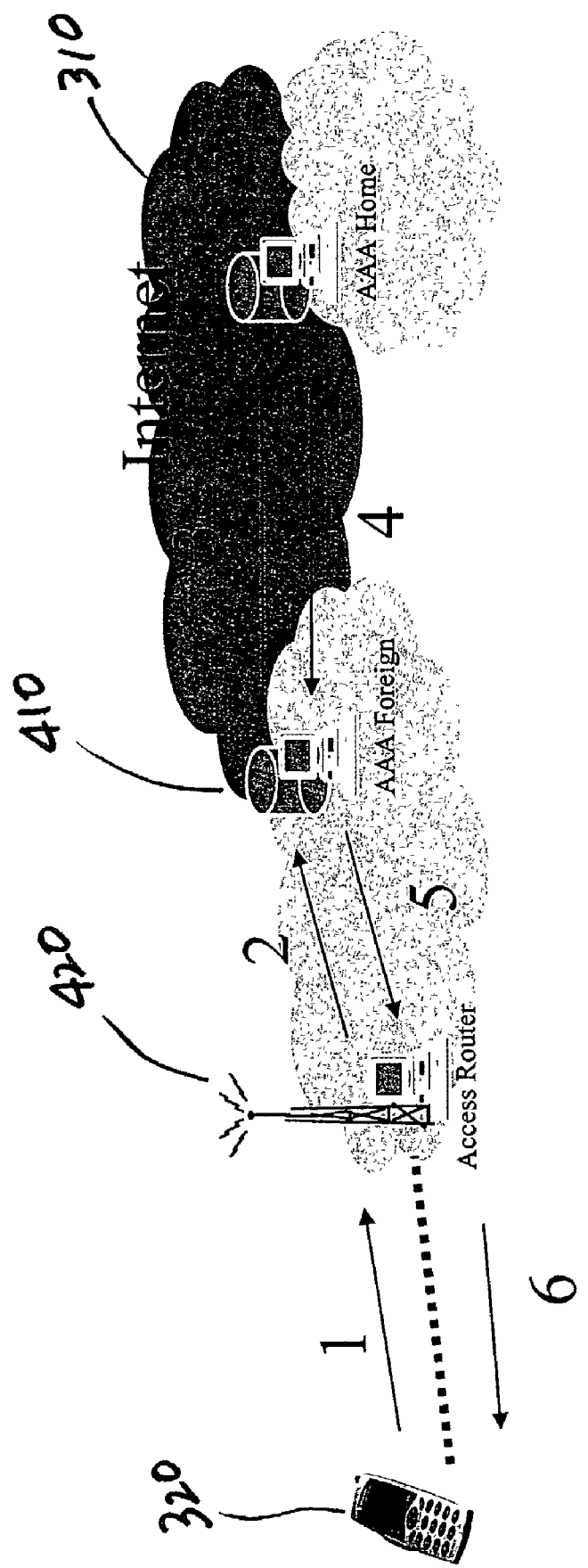
FIG. 12 is a flow chart illustrating a authentication protocol using Router Discovery mechanism, according to an embodiment of the invention, in which an asymmetrical key algorithm is used.

In the above embodiments, the authentication protocol according to the present invention is discussed, using an AAA infrastructure that adopts a symmetric key scheme, i.e., a shared secret key algorithm. As those skilled in the art can appreciate, the authentication protocol according to the present invention, of course, works with an asymmetric key scheme, such as public key algorithm. How the authentication protocol according to the present invention works with the public key algorithm will be explained with reference to FIG. 12. In FIG. 12, it is assumed that the client 320 just enters the domain 400, which the client has never visited before. Therefore, the client 320 has to go through the initial authentication process.

(1) The client 320 begins router discovery by sending out an extended Router Solicitation message (RS+). The extended Router Solicitation (RS+) in this embodiment includes a standard router solicitation message (RS). The RS+ also carries the client's identifier and a signature of the client 320. The signature is a digest of the extended Router Solicitation (RS+) encrypted by the secret key of the client. Thus, the extended Router Solicitation (RS+) may be expressed by:

RS+client_id+signed by client.

The client's secret key is defined by the security association SA3 (see FIG. 4) established between client 320 and AAAH 410. Thus, the AAAH 410 has the client's public key to verify the client's signature stored in the extended Router Solicitation (RS+). In the setting illustrated in FIG. 12, the AAAH 410 is the only entity that can verify the client's signature.

(2) The AR 420 receives the extended Router Solicitation (RS+) from the client 320 but cannot verify the client's signature because it does not have the public key to decrypt the signature. The AR 420 then prepares an AAA Request (AAA Req) and sends it to the AAAF 410 along with a copy of the entire RS+.

(3) The AAAF 410 does not have the client's public key and cannot verify the client's signature. The AAAF 410 then places its public key into the AAA Req and forwards it to the AAAH 310.

(4) When receiving the AAA Req from the AAAF 410, the AAAH 310 verifies the identity of client 320 by decrypting the client's signature stored in the AAA Req, using the public key of client. If the AAAH 310 successfully verifies the client's signature, the AAAH 310 replies to the AAA Req by preparing an AAA reply (AAA Rep) and transmitting it to the AAAF 410. This AAA Rep carries the public key (PK) of client 320 and a certificate of AAAF 410. The certificate of AAAF 410 is prepared by extracting the public key of AAAF 410 from the AAA Req and encrypting it, using the secret key of AAAH 310, which is defined by the pre-established security association SA3. Thus, the AAA Rep from the AAAH 310 to the AAAF 410 may be expressed by:

PK of client+AAAF certified by AAAH.

(5) The AAAF 410 extracts the public key of the client 320 from the AAA Req and stores it in its cache. The public key extracted is going to be used by the AAAF 410 to authenticate messages from the client 320. The AAAF 410 then prepares a certificate of AR 420, places the certificate in the AAA Rep and sends the AAA Rep to the AR 420. The certificate of AR 420 includes the public key (PK) of AR 420, which is signed by the secret key of AAAF 410. Thus, the AAA Rep from the AAAF 410 to the AR 420 may be expressed by:

PK of client+AR certified by AAAF+AAAF certified by AAAH.

(6) When receiving the AAA Rep from the AAAF 410, the AR 420 extracts the public key of the client and stores it in its cache. The public key of the client is going to be used by the AR 420 to authenticate messages from the client 320. The AR 420 then prepares an extended Router Advertisement (RA+) and unicasts it to the client 320. The extended Router Advertisement (RA+) includes a standard Router Advertisement message (RA) and further includes the certificate of AR 420 prepared by the AAAF 410 and the certificate of AAAF 410 prepared by the AAAH 310. Thus, the extended Router Advertisement may be expressed by:

RA+AR_id+AR certified by AAAF+AAAF certified by AAAH+signed by AR.

When receiving the extended Router Advertisement (RA+) from the AR 420, the client 320 verifies the authenticity of the received router advertisement. The client 320 first decrypts the certificate of AAAF 410 to extract the public key of the AAAF 410, using the public key of AAAH 310. The public key is from the pre-established security association SA3 between client 320 and AAAH 310. If the certificate is successfully decrypted, the client 320 can trust the extracted public key of AAAF 410 because it is certified by the AAAH 310, which the client trusts. Next, the client, using the extracted public key of AAAF 410, decrypts the certificate of AR 420 to extract the public key of AR 420. If the certificate is successfully decrypted, the client 320 can trust the public key of the AR because it is certified by the AAAF 410, which the client now trusts. With the public keys of AR 420 and AAAF 410, which are distributed to the client 320, new security associations SA4 and SA5 (FIG. 6) are established between client 320 and AR 420 and between client 320 and AAAF 410.

What have been described are preferred embodiments of the present invention. The foregoing description is intended to be exemplary and not limiting in nature. Persons skilled in the art will appreciate that various modifications and additions may be made while retaining the novel and advantageous characteristics of the invention and without departing from its spirit. Accordingly, the scope of the invention is defined solely by the appended claims as properly interpreted.

The invention claimed is:

1. An authentication process comprising the steps of:
   at an access router, receiving from a mobile client a solicitation message that contains a proof of identity of the mobile client;
   when the access router has not previously received verification of the proof, verifying the proof by a trusted entity; and
   returning an advertising message from an access router when the proof is verified.

2. An authentication process as recited in claim 1, further comprising the step of certifying by the trusted entity to the mobile client any intermediate entities located between the mobile client and the trusted entity.

3. An authentication process as recited in claim 1, wherein the process is used in a communication network comprising a plurality administrative domains each served by at least one administrative server and each having at least one access router.

4. An authentication process as recited in claim 3, wherein the trusted entity is a server serving a home domain to which the mobile client belongs.

5. An authentication process as recited in claim 3, wherein the trusted entity is a server serving a foreign domain visited by the mobile client.

6. An authentication process as recited in claim 3, wherein the trusted entity is an access router that has received the solicitation message from the mobile client.

7. An authentication process as recited in claim 1, wherein the advertising message contains a proof of identity of the access router for authentication by the mobile client.

8. An authentication process as recited in claim 1, further comprising:
   voluntarily sending out from a mobility serving node an advertising message that contains a proof of the identity of the access router for verification by mobile clients.

9. An authentication process as recited in claim 1, wherein the steps recited in claim 1 are performed while the mobile client is in communication with the access router to re-authenticate the access router to the mobile client, and wherein the advertising message from the access router contains a proof of identity of the access router.

10. An authentication process as recited in claim 1, wherein an access router, while in communication with the mobile client, sends out an advertisement message with short effective lifetime to initiate re-authentication of the mobile client to the access router.

11. An authentication process as recited in claim 1, wherein IPv4 is adopted for data communication.

12. An authentication process as recited in claim 1, wherein IPv6 is adopted for data communication.

13. An authentication process as recited in claim 1, wherein the verification is performed, using an asymmetric key algorithm.

14. An authentication process as recited in claim 1, wherein the verification is performed, using a symmetric key algorithm.

15. An authentication process as recited in claim 1, wherein at least one of the solicitation message and the advertising message includes a challenge.

16. A mobile client comprising:
   a transmitter;
   a receiver; and
   a processor that (a) sends out over the transmitter a solicitation message that contains a proof of identity of the mobile client, the proof of identity being provided to allow presentation to a trusted entity for verification, and (b) receives
   an advertising message from an access router.

17. A mobile client as recited in claim 16, wherein the advertising message contains a proof of identity of the access router.

18. A mobile client as recited in claim 16, wherein the mobile client sends out the solicitation message through the transmitter to the access router while the mobile client is in communication with the access router in order to re-authenticate the access router.

19. A mobile client as recited in claim 16, wherein IPv4 is adopted for data communication.

20. A mobile client as recited in claim 16, wherein IPv6 is adopted for data communication.

21. A mobile client as recited in claim 16, wherein the verification is performed using an asymmetric key algorithm.

22. A mobile client as recited in claim 16, wherein the verification is performed using a symmetric key algorithm.

23. A mobile client as recited in claim 16, wherein at least one of the solicitation message and the advertising message includes a challenge.

24. An AAA network comprised of a plurality of administrative domains each served by at least one administrative server and each having at least one access router deployed therein, comprising:

a mobile client that sends out a solicitation message that contains a proof of identity of the mobile client;
   a trusted entity that verifies the proof; and
   an access router that returns an advertising message only when the proof is successfully verified.

25. An AAA network as recited in claim 24, wherein the trusted entity certifies to the mobile client any intermediary entities located between the mobile client and the trusted entity.

26. An AAA network as recited in claim 24, wherein the trusted entity is a server serving a home domain to which the mobile client belongs.

27. An AAA network as recited in claim 24, wherein the trusted entity is a server serving a foreign domain visited by the mobile client.

28. An AAA network as recited in claim 24, wherein the trusted entity is an access router that has received the solicitation message from the mobile client.

29. An AAA network as recited in claim 24, wherein the advertising message contains a proof of the identity of the access router for authentication by the mobile client.

30. An AAA network as recited in claim 24, wherein the access router voluntarily sends out an advertisement message that contains a proof of identity of the access router, and the mobile client verifies the proof and sends out the solicitation message when it is unable to verify the proof.

31. An AAA network as recited in claim 24, wherein the mobile client sends out the solicitation message while in communication with the access router, and the access router sends out an advertising message that contains a proof of identity of the access router for authentication by the mobile client.

32. An AAA network as recited in claim 24, wherein the access router, while in communication with the mobile client, sends out an advertisement message with a short lifetime to induce the mobile client to send out the solicitation message.

33. An AAA network as recited in claim 24, wherein IPv4 is adopted for data communication.

34. An AAA network as recited in claim 24, wherein IPv6 is adopted for data communication.

35. An AAA network as recited in claim 24, wherein the verification is performed, using an asymmetric key algorithm.

36. An AAA network as recited in claim 24, wherein the verification is performed, using a symmetric key algorithm.

37. An AAA network as recited in claim 24, wherein at least one of the solicitation message and the advertising message contains a challenge.

* * * * *